Sept. 24, 1968          H. A. SLATER          3,403,214

MOUNTING MEANS FOR ELECTRICAL WIRING DEVICES

Filed July 8, 1966

INVENTOR
HERBERT A. SLATER
BY
*Darly & Darly*
ATTORNEYS

United States Patent Office 3,403,214
Patented Sept. 24, 1968

3,403,214
MOUNTING MEANS FOR ELECTRICAL WIRING DEVICES
Herbert A. Slater, New York, N.Y., assignor to Slater Electric, Inc., Glen Cove, N.Y., a corporation of New York
Filed July 8, 1966, Ser. No. 563,792
6 Claims. (Cl. 174—53)

ABSTRACT OF THE DISCLOSURE

A mounting strap for rapidly mounting an electrical wiring device in an outlet box. The strap has a portion bent at right angles to the strap to extend into the threaded aperture of a mounting box ear. A camming lever at the other end of the strap cooperate with the screw head to hold the strap securely in place.

---

The present invention relates to mounting means for electrical wiring devices and particularly means for mounting electrical wiring devices such as switches, plug receptacles and the like in outlet boxes such as those commonly known as gem boxes which are recessed in the walls of a building to accommodate such electrical wiring devices.

Customarily, such outlet boxes are provided with ears at the center of the top and bottom thereof and the electrical wiring devices to be mounted therein are provided with mounting straps having apertures mating with apertures in the box ears. The apertures in the box ears are threaded while the apertures in the mounting straps are not threaded but are customarily horizontally elongated to permit adjustment of the position of the wiring device in the box.

By virtue of this arrangement the vertical center line of the wiring device may be arranged to extend truly vertically so that any misalignment of the outlet box when it is mounted in the walls will not affect the appearance of the wall plate which covers the electrical wiring device and is normally fastened thereto.

The mounting screws by which the electrical wiring device is held in position on the outlet box must be of considerable length in order to care for the situation when the box is mounted in the wall with its front edges flush with the outer wall surface while at the same time caring for other situations in which the box is not mounted flush to the wall but is recessed therefrom. Because of this, it takes a considerable time to tighten the mounting screws particularly since these screws are also normally of fine pitch.

My present invention reduces the time necessary to install a wiring device in an outlet box by virtue of the fact that only one screw need be tightened into final position, the other screw being replaced by a serrated member and a lever being provided on the mounting strap which cooperates with the mounting screw to cause the serrated member to firmly engage the aperture in the mounting ear, thus firmly holding the electrical wiring device in position in the outlet box at the top and at the bottom.

It is the object of the invention to provide means for mounting an electrical wiring device in an outlet box which is simple and which reduces materially the time required for such installation.

It is another object of the invention to provide such mounting means wherein one of the mounting screws normally provided is replaced with a serrated spike-like member fixed to the mounting strap and cooperating with the aperture in one of the mounting ears of an outlet box.

It is another object of the invention to provide such a mounting device wherein by lever action the remaining mounting screw forces the serrated member into firm contact with the threaded inner walls of the mounting ear aperture so that the remaining screw when tightened into position causes the electrical wiring device through its mounting strap to be firmly held to the outlet box both at the top and at the bottom.

Other objects and features of the invention will become apparent when the following description is considered in connection with the appended drawings in which, FIGURE 1 is a front elevational view of a mounting box having a wiring device with mounting means in accordance with my invention, mounted therein;

Figure 1:
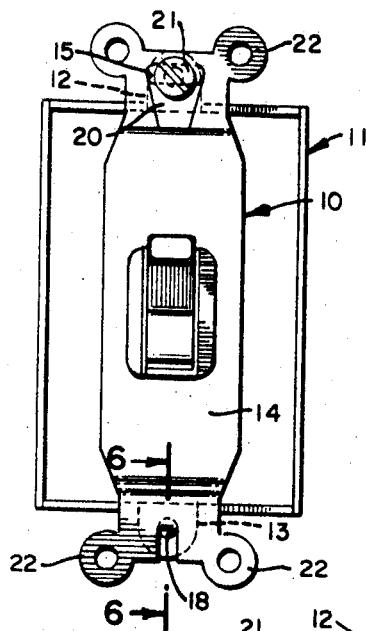

Referring now to the drawings, the electrical wiring device 10, which in this instance is illustrated as a switch, is shown mounted in the ordinary outlet box 11 which box has mounting ears 12 and 13 at the respective upper and lower ends thereof.

Switch 10 is provided with the usual mounting strap 14 which has the usual horizontally extending slot 15 in the upper end thereof, the slot being positioned to cooperate with the threaded aperture 16 in the upper ear 12 of the box 11.

At its lower end the mounting strap 14 has no slotted opening such as 15, but is instead provided with a member 17 bent off from the strap or from the material of adjacent straps as the straps are being stamped. This member 17 extends at right angles to the mounting strap and is positioned to extend through the threaded aperture 18 in the lower mounting ear 13.

Figure 4:
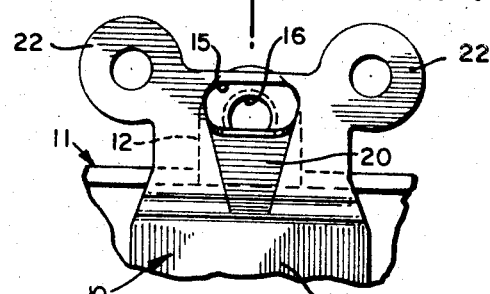
FIGURE 4 is a fragmentary front elevational view to an enlarged scale showing the relationship of the mounting strap and the lever bent off therefrom.
Figure 5:
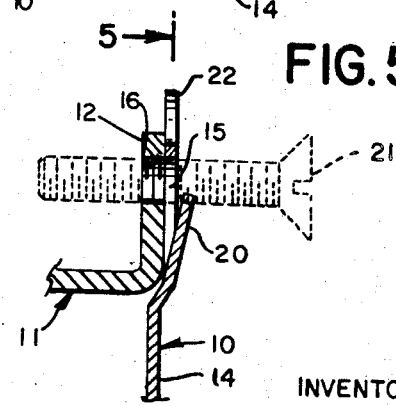
FIGURE 5 is a vertical cross-sectional view taken on the plane of the line 5—5 of FIG. 4 and showing the positions of the parts as the screw is approaching its final tightened condition.
Figure 6:
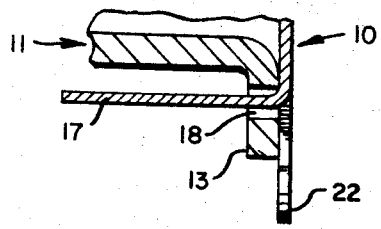
FIGURE 6 is a fragmentary enlarged vertical cross-sectional view taken on the plane of the line 6—6 of FIGURE 1 and showing the mode of fastening the wiring device at its lower end.

Bent off from the upper portion of the mounting strap 14 is a member 20 which is of such a length that when in the plane of strap 14 it partially overlies the aperture 16 in the ear 12 and the upper end of which constitutes the lower wall of the aperture 15 in the mounting strap. The member 20 is bent out to lie forwardly of the mounting strap as is particularly shown in FIGURES 2, 4 and 5.

Figure 2:
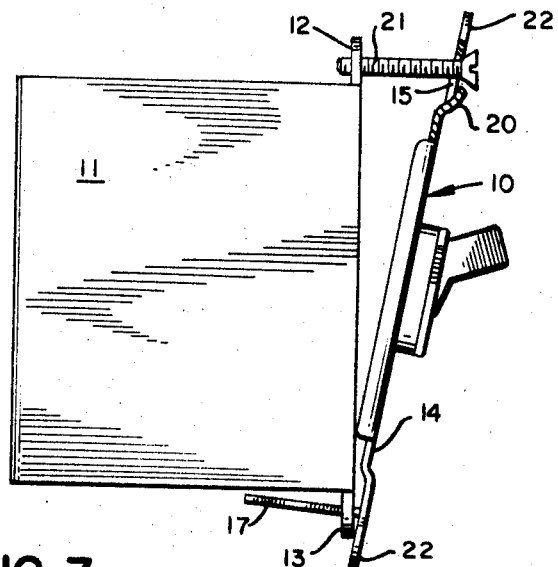
FIGURE 2 is a side elevational view showing the initial stage of mounting an electrical wiring device, in this instance a switch, in an outlet box.

As is illustrated particularly in FIGURE 2, the device is mounted in the outlet box by first inserting the serrated member 17 in the opening 18 in the lower mounting ear 13. The usual mounting screw 21 is then inserted through the opening 15 and threaded into the opening 16 as will be apparent from FIG. 2. As screw 21 is tightened into position the screw bears against the upper edge of the lever member 20 forcing the strap 14 downwardly so that its lower serrated edge engages firmly with the threads of the aperture 18.

Figure 3:
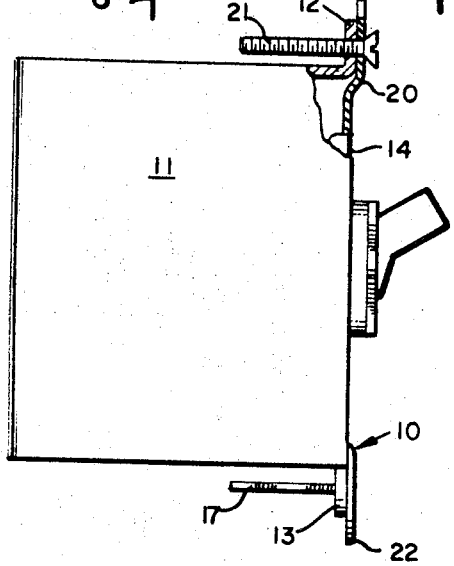
FIGURE 3 is a view similar to FIGURE 2, but showing the electrical wiring device in its final position.

As is shown clearly in FIGURE 3 as the screw 21 is brought into its final tightened position the head thereof provides camming action and forces the mounting strap 14 and wiring device mounted thereon still further downwardly so that a still increased pressure is exerted upon the fastening member 17 to engage even more firmly with the lower threaded opening 18 in ear 13.

As has been indicated hereinabove, the mounting strap 14 does not always seat against the forward edges of the outlet box 11, but in many instances the "plaster" ears normally provided on the mounted strap and designated 22 engage with the material (such as plaster) from which the wall is made while the box 11 is recessed from that surface. When this situation obtains, the mounting means of my invention operates in the same manner as heretofore described save that there is a space between the outlet box ears 12 and 13 and the ends of the mounting strap.

While I have described a preferred form of my invention, it will be understood that many modifications and variations thereof may be made without departing from the spirit of the invention. For example, the lever member 20 might be made separately from the mounting strap and be provided with a shoulder portion at its lower end to engage a slot in the mounting strap. Although this arrangement is equally effective it has the disadvantage that the lever member 20 may be lost since it is not a permanent part of the structure.

While the box and wiring device have been described as mounted in an upright position with the mounting ears at the top and bottom, in many instances, especially when the device is a receptacle, the box is horizontally mounted and therefore any reference to position hereinabove has been solely to facilitate description.

Since the above mentioned and other variations are readily made I wish to be limited not by the foregoing description but on the contrary solely by the claims granted to me.

What is claimed is:

1. Means for mounting an electrical wiring device having a mounting strap fixed thereto in an outlet box having threaded screw receiving apertures spaced at opposite ends thereof, comprising, in combination, an opening in the strap corresponding to a first one of said screw receiving apertures, a rearwardly extending member fixed to the strap and positioned and adapted to extend into the second screw receiving aperture, a lever mounted on said strap and extending forwardly and upwardly from the face thereof, the upper end of said lever being adapted to bear against a screw passing through said opening and threaded into the first one of said screw-receiving apertures, whereby when the rearwardly extending member is placed in the second of said apertures, and a screw extending through said opening and into said first threaded aperture is tightened, the strap is forced downwardly, and said rearwardly extending member engages the wall of the second of said apertures to fix the strap and wiring device in position at one end thereof, and the screw fixes the strap and wiring device in position at the opposite end thereof.

2. Mounting means as claimed in claim 1, wherein said lever comprises a portion of the material of the strap which is bent off therefrom and extends outwardly at an angle from the strap, the end of said portion prior to bending forming a portion of the wall of said opening in said strap.

3. Mounting means as claimed in claim 1, wherein said rearwardly extending member is serrated, said serrations cooperating with the threads of the threaded aperture.

4. Mounting means as claimed in claim 1, wherein said rearwardly extending member comprises a portion of the material of the strap, said portion being bent to extend substantially at right angles with respect to the plane of the strap.

5. Mounting means as claimed in claim 1, wherein said opening in said strap is elongated in a direction transverse of the longitudinal center line of said strap.

6. Mounting means as claimed in claim 2, wherein said opening in the strap is elongated in a direction perpendicular to the longitudinal axis of the strap and wherein said bent-off lever comprises a portion of said strap, the upper end of which, prior to bending, constitutes a major portion of one side of said elongated strap opening, said lever end being adapted to slightly overlie the corresponding threaded aperture, said lever when bent into its final position permitting the passage of a screw through said elongated strap opening into the corresponding one of said threaded box apertures, whereby as said screw is tightened, said lever exerts pressure along the longitudinal center line of the strap, pressing said rearwardly extending member into locking engagement with the other of said threaded apertures, said movement under urge of said lever continuing until said lever is forced substantially into the plane of the strap.

References Cited

UNITED STATES PATENTS

| | | | |
|---|---|---|---|
| 1,807,410 | 5/1931 | Hubbard | 174—57 |
| 3,059,045 | 10/1963 | Swartwood | 174—53 |

LARAMIE E. ASKIN, *Primary Examiner.*

D. A. TONE, *Assistant Examiner.*